United States Patent [19]

Debortoli

[11] Patent Number: 5,668,911
[45] Date of Patent: Sep. 16, 1997

[54] STORAGE HOLDERS FOR OPTICAL FIBERS

[75] Inventor: George Debortoli, Ottawa, Canada

[73] Assignee: Northern Telecom Limited, Montreal, Canada

[21] Appl. No.: 680,285

[22] Filed: Jul. 11, 1996

[51] Int. Cl.⁶ .................................................. G02B 6/36
[52] U.S. Cl. ............................................. 385/135
[58] Field of Search .................... 385/134, 135, 385/136, 137, 138, 139

[56] References Cited

U.S. PATENT DOCUMENTS

5,067,784  11/1991  Debortoli et al. ............... 385/53
5,337,400  8/1994   Morin et al. ................... 385/135
5,353,367  10/1994  Czosnowski et al. ............ 385/135

*Primary Examiner*—Phan T. H. Palmer
*Attorney, Agent, or Firm*—R. J. Austin

[57] ABSTRACT

A storage holder for optical fibers, the holder having a base and a movable lid for opening or closing an access side to a storage chamber provided within the base for storing the fibers. The chamber has an inlet and an outlet for the fibers. The base and lid having cooperable means to ensure that at least one winding of the fiber remains within the storage chamber with the lid closed and remains within the chamber with the lid open until manually removed from within the chamber.

9 Claims, 7 Drawing Sheets

STORAGE HOLDERS FOR OPTICAL FIBERS

BACKGROUND OF THE INVENTION a) Field of the Invention

This invention relates to storage holders for optical fibers.

b) Relevant Prior Art

Storage holders for optical fibers have been developed during the recent past for use within the telecommunications industry. These holders have storage chambers for accommodating storage windings of superfluous lengths of fiber which are being directed either to optical fiber connectors or to optical fiber splices. Such holders are stored normally in a particular orientation. In this orientation, the holders, which are tray-shaped, are disposed horizontally and are open at the top for insertion of the fibers as windings into the storage chambers. The holders may have tops to close the trays and may also have fingers extending partly across the storage chambers to define gaps for insertion or removal of fibers. Because the holders are open at their tops, the fiber windings, while being held at their desired radii and configurations upon bases of the holders, are not inclined to move upwards through the gaps and out from the storage chambers. Hence, no problem is found in controlling a fiber in its windings and the fiber may be removed manually by unwinding it from a storage chamber through the gaps. Absolute fiber control is thus guaranteed.

It is now being suggested that optical fiber cable should be used in an outside plant uncontrolled environment to transmit multimedia transmission signals (broadband services and cable television signals) to the home or other buildings. Indeed, some systems have been developed and are in use. These systems incorporate optical fiber storage holders having design concepts similar to those used in telecommunication optical fiber systems. However, the use requirements are different for holders to be used to transmit broadband data and cable television signals in the outside plant environment from those for telecommunications systems in the inside plant environment and as a result, known holders are not particularly successful in retaining optical fibers in the bases of the storage chambers. A reason for this is that when such holders are used for the purpose of transmitting multimedia signals or cable television signals, the holders are necessarily carried in an outside plant environment within weatherproofed containers provided for the conversion of optical fiber signal reception into electrical signals. These containers are mounted in various positions, either upon telephone poles, slung beneath carrier cables extending between the poles, above ground in pedestal housings or below ground in hand holes. Movement of the containers under ground vibrations, wind conditions, accessing other components and also temperature change conditions effect deformation of the fiber storage holders. Unlikely as it may seem, under such conditions, the fibers in the windings in the storage chambers are found to move out from the chambers, presumably through the insertion and removal gaps provided. Hence, it follows that when a maintenance engineer opens the containers with the object of opening the holders for inspection or maintenance procedure, he may discover that the stored lengths of fibers are falling out from the chambers and are difficult in these circumstances to be correctly placed back into storage positions without causing possible fiber damage and thus customer interruptions. This problem is aggravated because the maintenance person is operating high above ground level or below ground level and is possibly operating in difficult weather conditions. Also under vibrations conditions fibers moving outwards can get pinched between lid or cover and storage chamber causing fiber breakage and thus customer interruptions.

SUMMARY OF INVENTION

The present invention seeks to provide a storage holder for optical fibers in which the above problem is at least minimized.

Accordingly, the present invention provides a storage holder for optical fibers comprising a base and a lid movable for opening or closing an access side to a storage chamber provided within the base for storing the fibers in the form of at least one winding with a minimum bend radius to the winding, and having an inlet and an outlet to the chamber for fibers and the base and lid having cooperable means to ensure that the at least one winding remains within the storage chamber with the holder closed and remains within the storage chamber with the holder open until removed manually from within the chamber.

Effectively therefore the storage holder provides a winding insertion and removal gap for the windings of fiber, and the lid cooperates with the base so as to protect this gap against any movement of the winding through the gap which could result in escape of fiber from the storage chamber.

In a preferred arrangement, the base has spaced winding retaining means extending across the access side to the chamber for retaining the windings within the chamber with the winding retaining means providing the winding insertion and removal gap for lateral insertion and removal of a winding from the chamber. The lid in this structure has at least one rib extending to a position adjacent to each of the retaining means so as to prevent the fiber in the winding from entering laterally into the removal gap. It is also preferred that each retaining means comprises a cantilever retaining finger extending across the access side to the storage chamber and this finger terminates at its free end at one side of the insertion and removal gap. The lid may have a rib extending either alongside the finger and adjacent to it or the rib may be aligned with or extend into the insertion and removal gap. With either construction, the rib will hold the winding of fiber downwardly away from the cantilever retaining finger and thus away from the insertion and removal gap. It is also to be preferred that the lid has two ribs which extend laterally of the chamber one along each side of and adjacent to each of the fingers. These ribs may be integral with an intermediate rib region which passes from side-to-side of the finger through the insertion and removal gap.

It is also to be preferred that the lid comprises a plurality of ribs which are associated with upstanding walls of the base, the upstanding walls defining boundaries to the storage chamber. These ribs which are associated with the walls lie adjacent to and are substantially parallel to each of the upstanding walls while being disposed within the access side of the chamber. Conveniently, each of the ribs associated with an upstanding wall is integrally formed and extends into the ribs which extend laterally of the chamber and lie adjacent to and alongside the finger.

BRIEF DESCRIPTION OF THE DRAWINGS

One embodiment of the invention will now be described, by way of example, with reference to the accompanying drawings, in which.

DESCRIPTION OF PREFERRED EMBODIMENT

In a telecommunications cable system employing optical fibers for transmitting television signals to locations adjacent to buildings, the system is intended to transmit the signals for a short distance between the optical fibers and the television receivers, by use of coaxial electrical cable of known form. In the embodiment to be described, the signals are converted from optical to electrical signals within a housing 10 as shown by FIG. 1, the housing 10 being environmentally sealed to prevent moisture and dust ingress.

Figure 1:
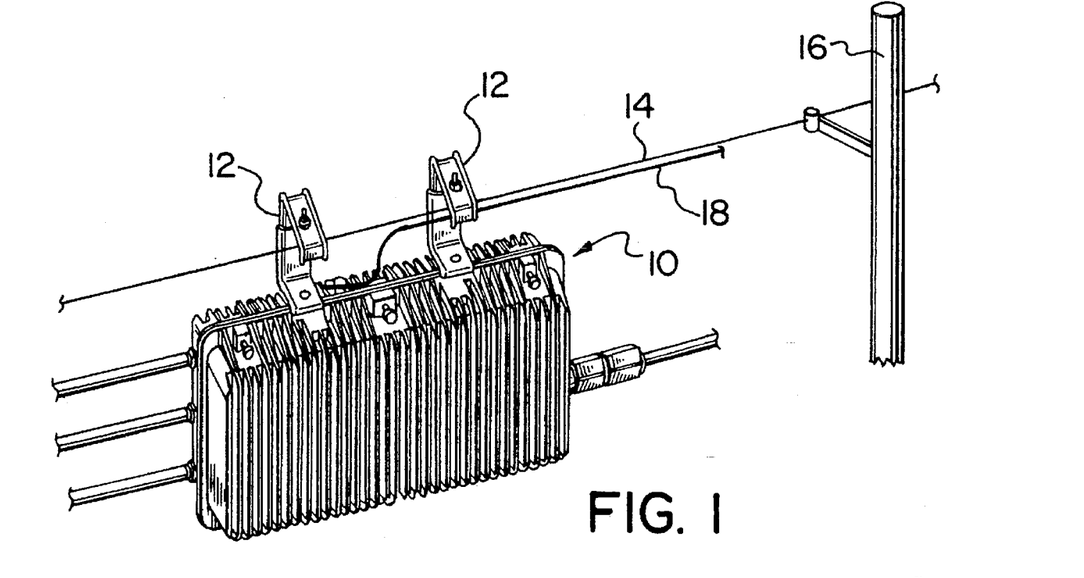
FIG. 1 is an isometric view of an aerial mounted housing within which optical signals translated into electrical signals for television usage.
Figure 2:
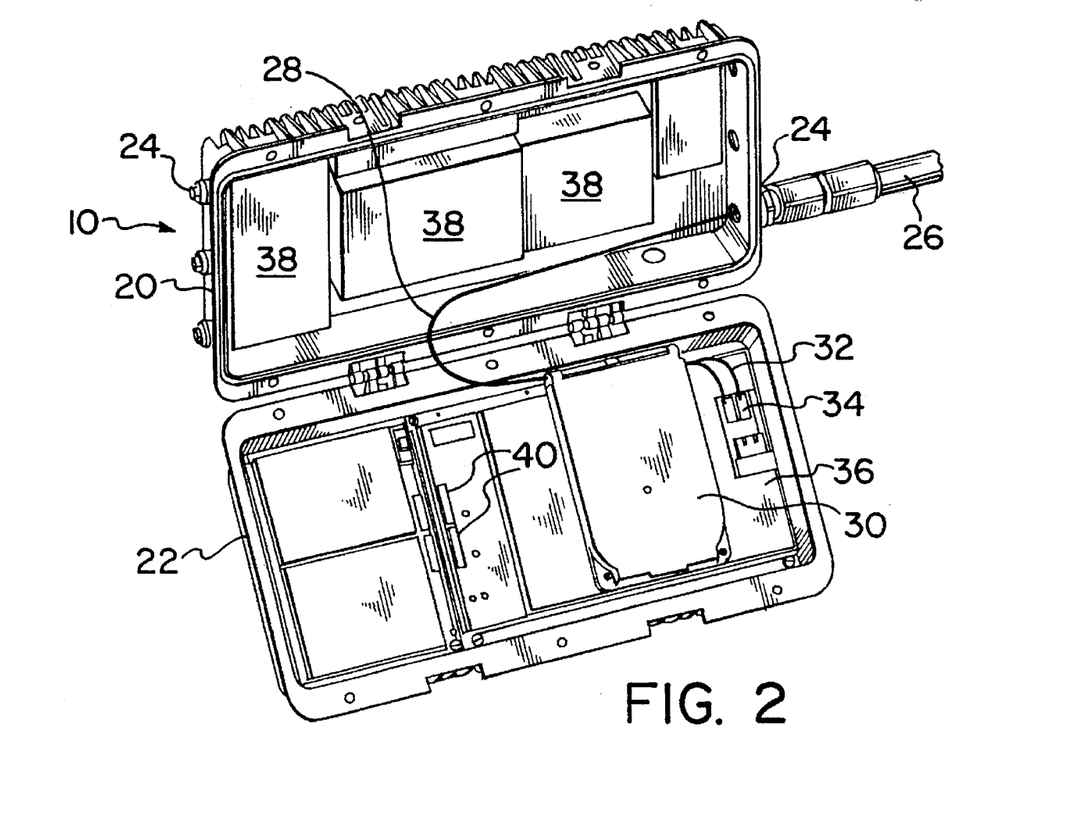
FIG. 2 is an isometric view of the housing of FIG. 1 and in an open condition.
Figure 3:
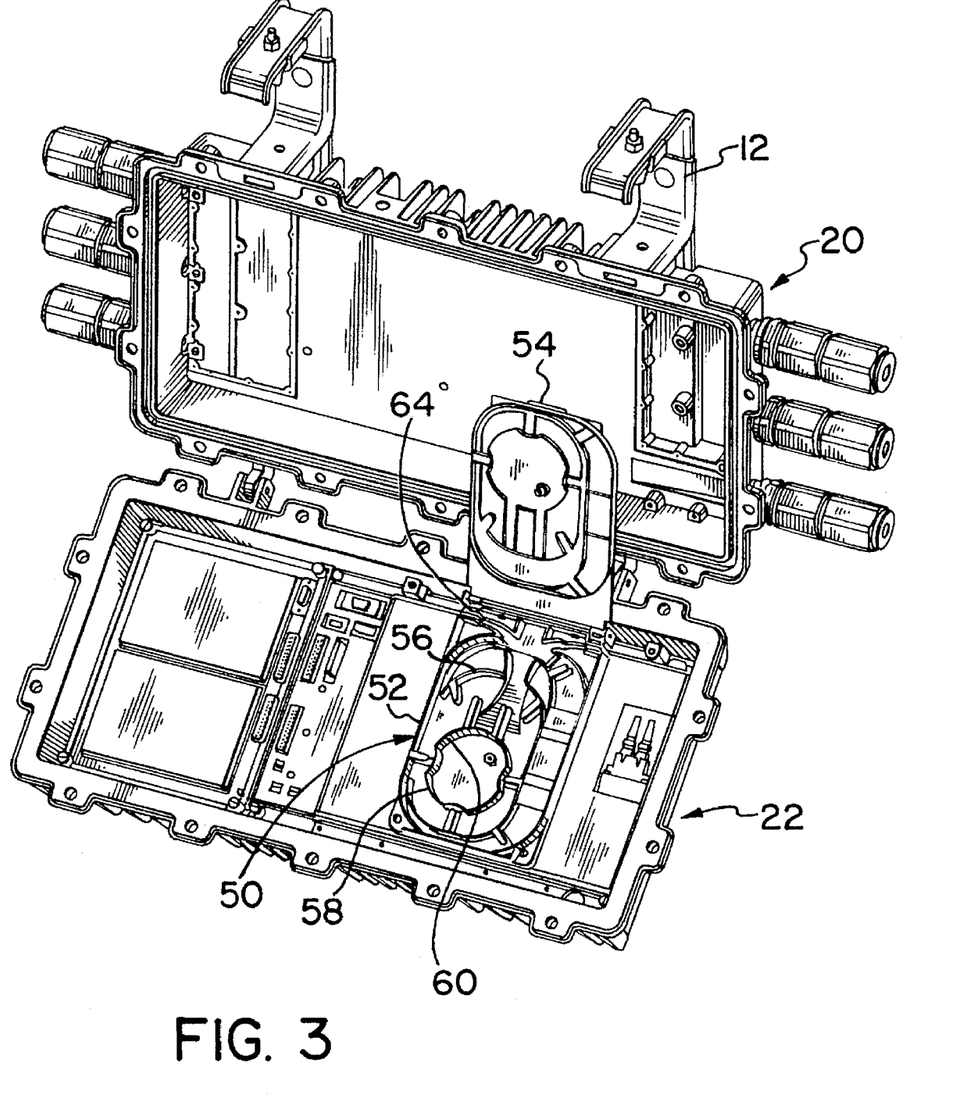
FIG. 3 is a view similar to FIG. 2 and also showing an optical fiber storage holder opened.

As shown in FIG. 1, the closed container 10 is mounted by two brackets 12 to an aerial carrying strand 14 between poles 16 (only one of which is shown). A suitable ground wire 18 is provided. As shown by FIG. 2, the housing 10 comprises two housing parts 20 and 22 which are hingedly connected together along an upper edge so that the housing when in a closed condition hangs about the upper edge substantially vertically from the brackets 12. The housing part 20 is provided at remote ends, with six inlets 24 for cable, three inlets at each end. Five of the inlets 24 may be used as required for electrical power and television signal requirements by the use of coaxial electrical cables 26 as shown by FIGS. 1, 2 and 3. The remaining inlet 24 carries an optical fiber cable 26. As shown particularly by FIG. 2, optical fibers 28 of the cable 26 extend into the housing 10 to pass to a tray shaped fiber storage holder 30. Ends 32 of the fibers are then brought to connectors 34 exteriorly of the holder 30.

Figure 5:
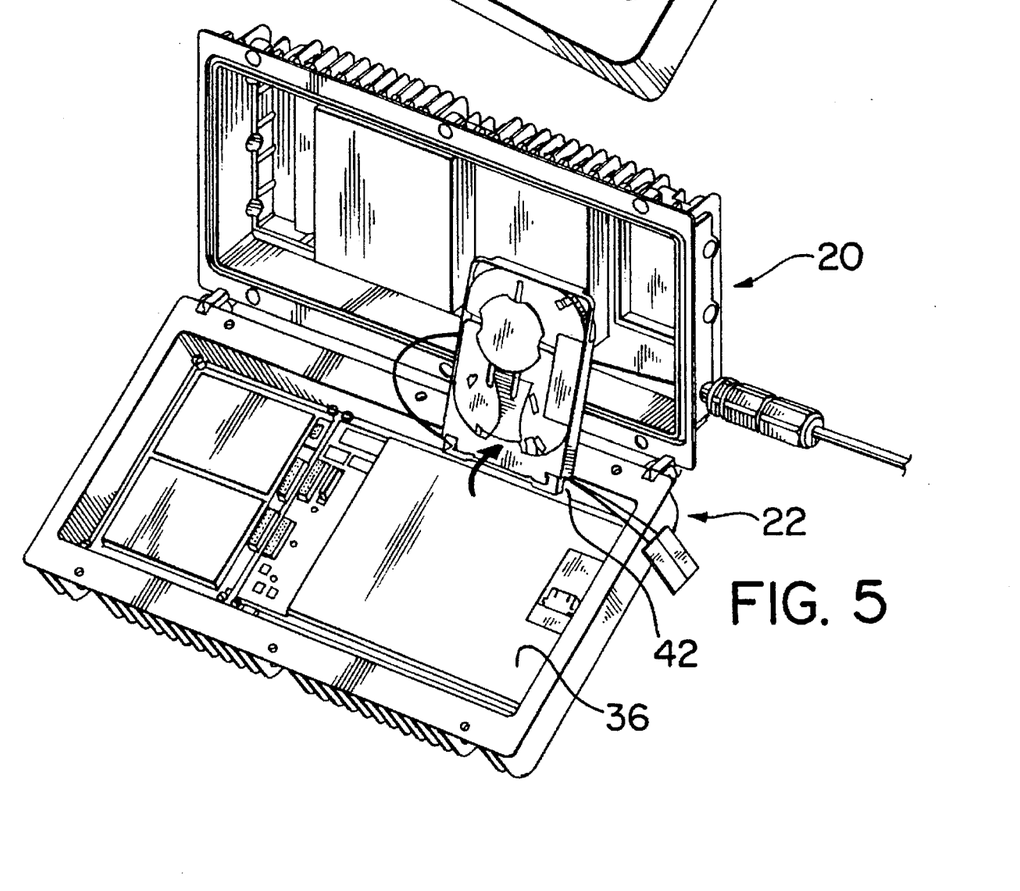
FIG. 5 is a view similar to FIG. 3 to show how the optical fiber storage holder in different orientation.

The connectors 34 pass signals from the fibers 32 to a printed circuit board arrangement (not shown) which is contained beneath a lid 36 mounted below the holder 30. From the printed circuit board arrangement, electrical television signals corresponding to the optical signals within the optical fibers 32 are conveyed to one or other of power units 38 carried by the housing part 20 from connectors 40 by electrical cables (not shown). As will be described, the storage holder 30 comprises a base and a lid which are pivoted together about one end upon a mounting bracket 42 (see FIG. 5) which is in turn secured within the housing part 22. As shown by FIG. 5 the bracket 42 enables pivotal movement of the storage holder 30 between its operational position on top of the cover 36 in FIG. 2 and a position removed from that position so as to enable the cover 36 to be removed for access to the printed circuit board arrangement.

As may be seen from the above description, the housing 10 in hanging from the strand 14 may be subject to any weather conditions which are prevailing. Thus the housing may be subjected to widely differing temperatures and also to wind forces which will have the effect of moving the housing 10 and its contents about the carrying strand 14 which itself will also be movable between the poles 16. As a result, the storage holder 30 may suffer temperature variations and will certainly change in angular orientation to the vertical in an extremely haphazard fashion. In view of the temperature variations and the movement of the housing and thus of the holder 30, it has been found that the optical fibers 28 in passing through the holder 30 are caused to move within and possibly out of their storage areas unless positive steps are taken to ensure that this cannot happen. The structure of the holder 30 to ensure that the fiber is retained correctly in position will now be described.

Figure 4:
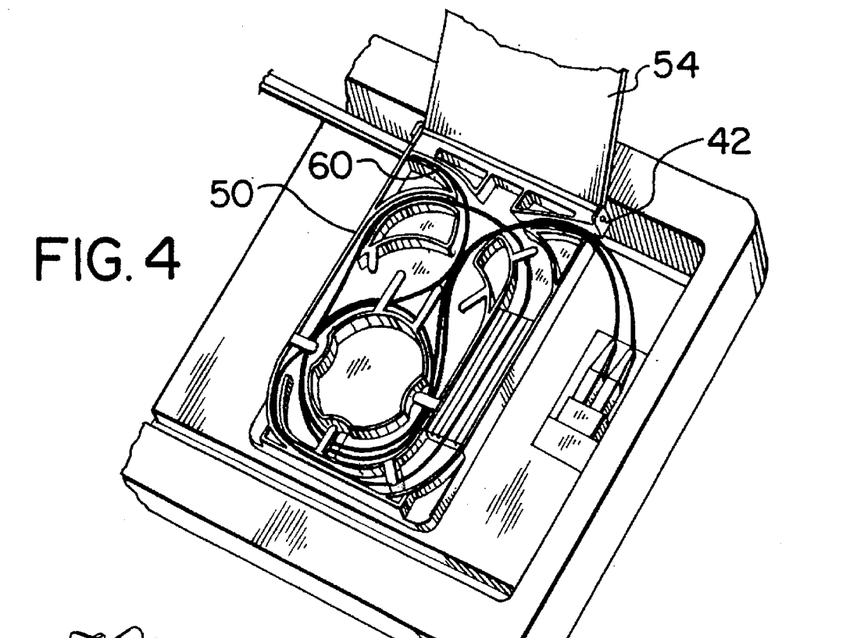
FIG. 4 is an isometric view similar to FIG. 3 but showing only a part of the housing to illustrate the manner in which optical fibers are stored within the holder.
Figure 6:
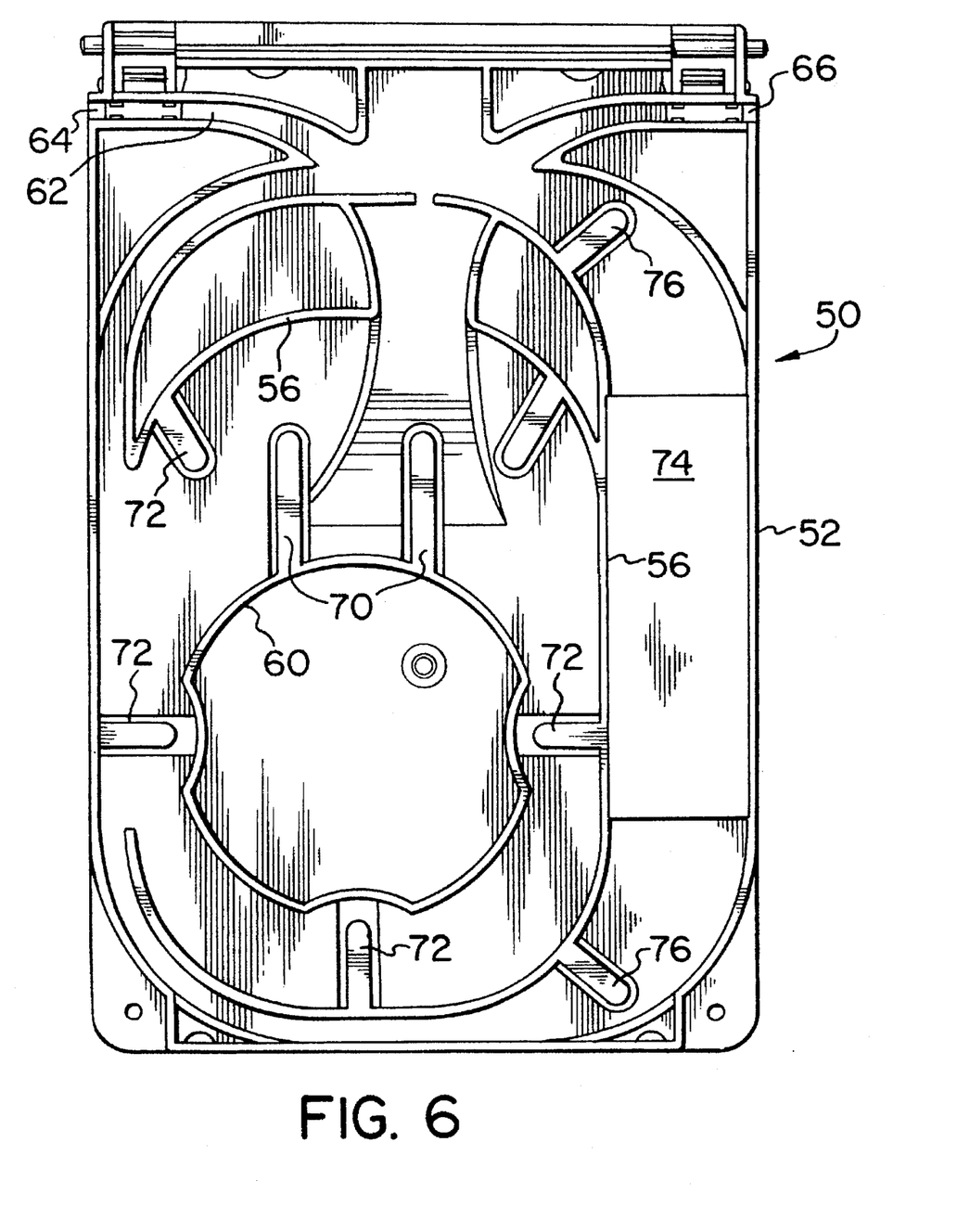
FIG. 6 is a plan view of a base of the holder.

As shown in FIGS. 3 and 4, the storage holder 30 comprises a base 50 with side walls 52 and a lid 54. The lid is pivotally mounted to the base about a hinge position coaxial with the hinge for the mounting bracket 42. As shown by FIGS. 3 and 4, the base is provided with a plurality of walls 56 which are arcuate and define the outside limits of a storage area 58 for storing windings of optical fiber 60 (see FIG. 4) which are wound around a central substantially circular wall 60. The wall 60 is disposed at a radius corresponding to the minimum bend radius of the windings of the fiber, at which radius it is believed that no attenuation or physical damage can result to the fiber. Other walls 62 (FIG. 6) define passages for the optical fiber to pass either to the inlet 64 or the outlet 66 for fiber and as defined in the boundary walls to the base. Thus, as shown by FIG. 2, the optical cable 26 is secured at its end to the associated inlet 24 and optical fibers 28 (only one of which is shown in FIGS. 2 and 4) extend through the container 10 to enter into the holder 30. These fibers then pass into the storage chamber 58 while passing around the internal wall 60 and then to the outlet 64 before being connected to the two optical connectors 34. As is more clearly shown in FIGS. 6 to 10, the base and the lid are provided with means for ensuring that the windings remain within the storage chamber with the holder closed and also remain within the storage chamber with the holder open until manually removed therefrom. This means comprises spaced winding and retaining means of the base in the form of a plurality (namely two) parallel cantilever retaining fingers 70 extending part-way across the widest portion of the storage chamber from the inside wall 60. The winding retaining means for the storage chamber also comprises a plurality (namely five) cantilever retaining fingers 72 which extend radially inwardly of the chamber from chamber boundary walls 56. One of the boundary walls 56 is spaced from an edge wall 52 to define a splicing region 74 within the base. Two further cantilever retaining fingers 76 extending outwardly from a wall of the base outwardly of ends of the splicing region.

This structure of the holder 30 as so far described is comparable to structures previously used for holding fibers with the holders in permanently horizontal positions. With such holders it has been found that with a base having storage chamber defining walls such as the walls 56 and also incorporating cantilever retaining fingers such as the fingers 70, 72 and 76, that optical fibers have remained in position until manually removed. However, when such structures are mounted in containers such as the container 10, there is a permanent problem in that with the movement of the container 10 and the subjection of the holder 30 to temperature changes that the stored fibers tend to move from beneath the retaining fingers whereby, when the lid opened upon the holder, the fibers tend to fall out in uncontrollable fashion and are difficult to store once again within the holder. It will be appreciated that this problem arises during maintenance procedures and primarily are normally encountered with the maintenance engineer operating at the dangerous heights of telegraph poles at which location the container 10 is normally disposed. This is a serious problem with holders and one which is solved by the use of the holder 30 in the embodiment and according to the invention as will now be described.

Figure 7:
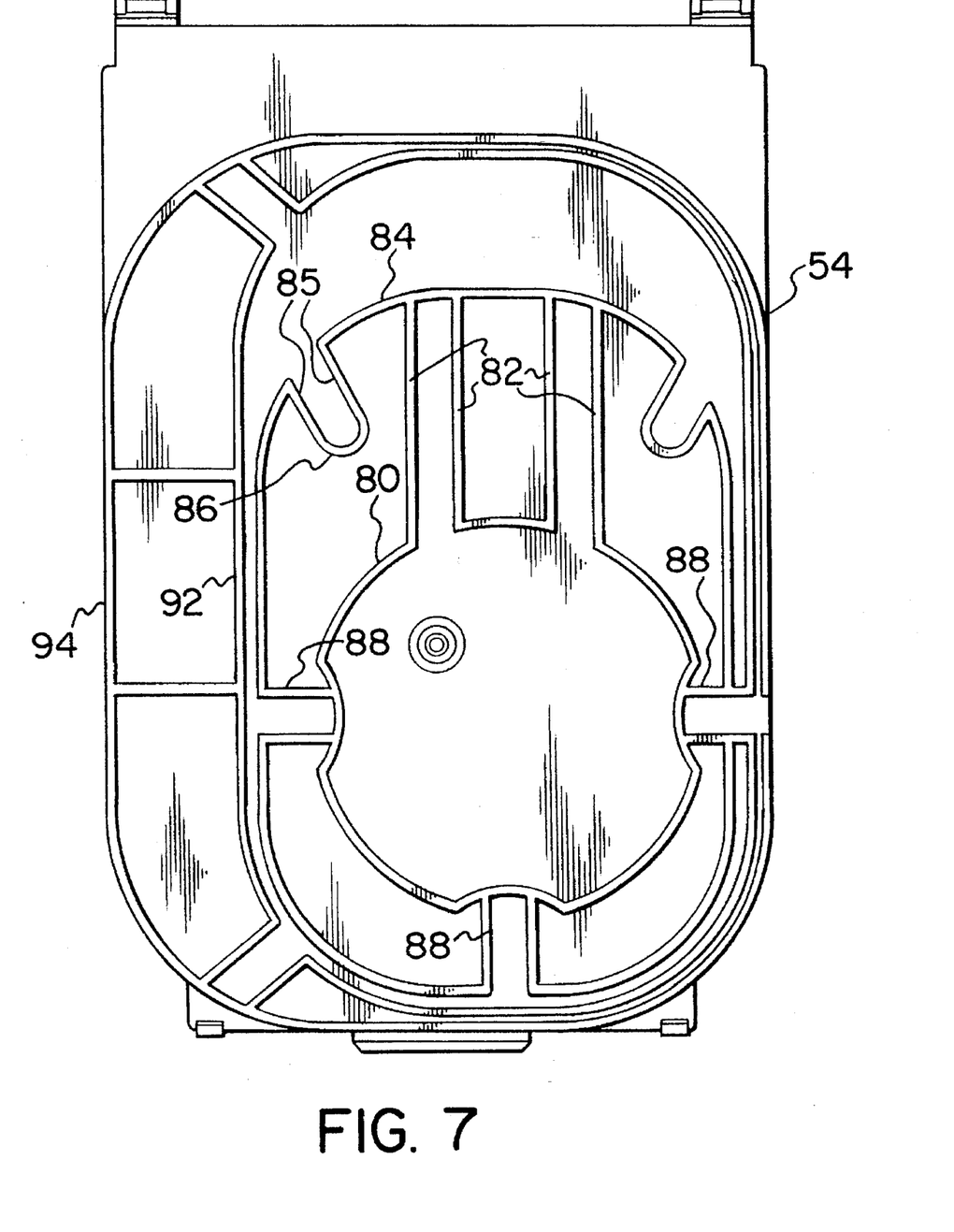
FIG. 7 is a plan view of the inside of the lid of the holder.
Figure 8:
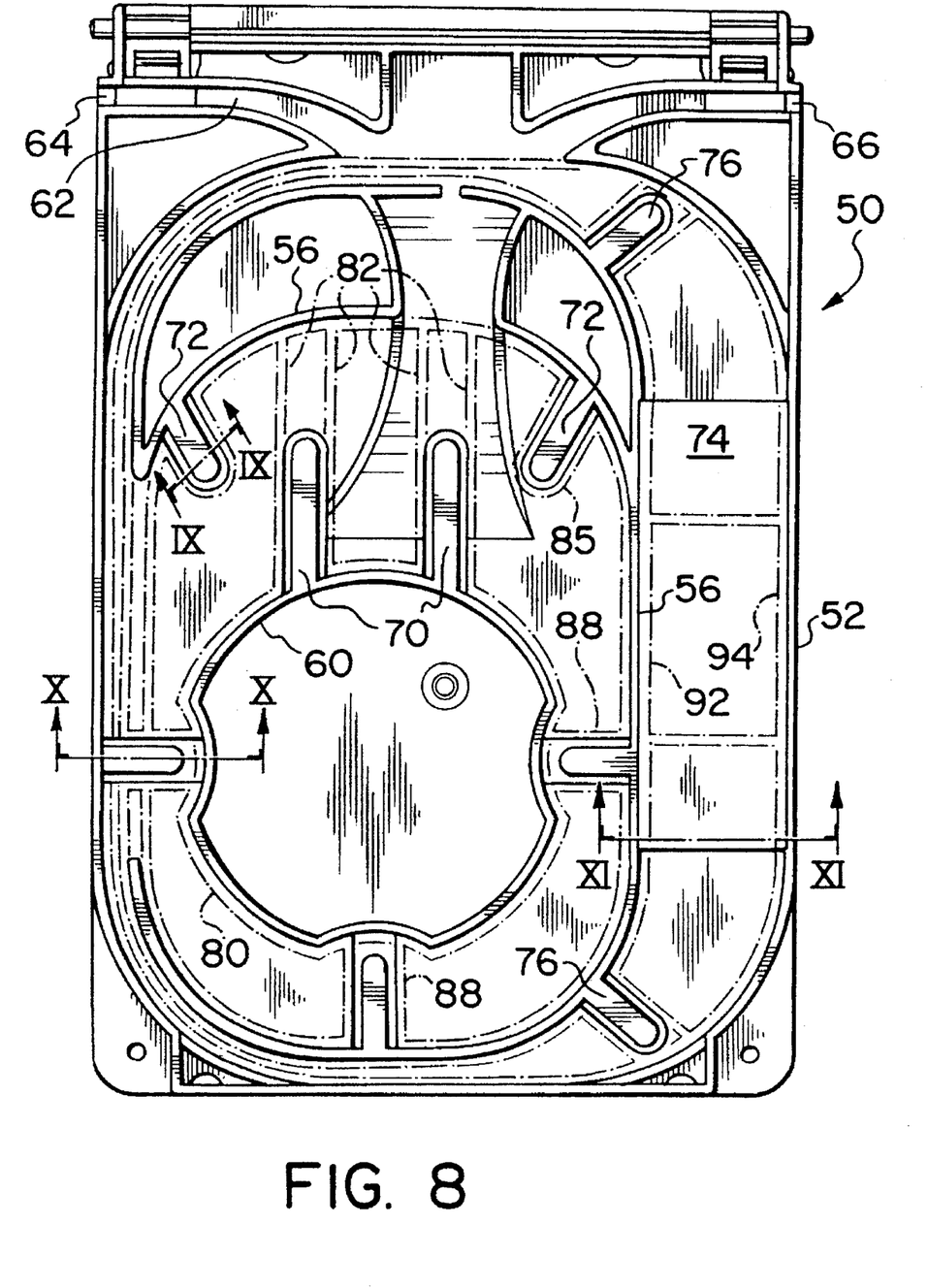
FIG. 8 is a view similar to FIG. 6 and showing relative positions of ribs on the lid to walls of the base of the holder.
Figure 9:
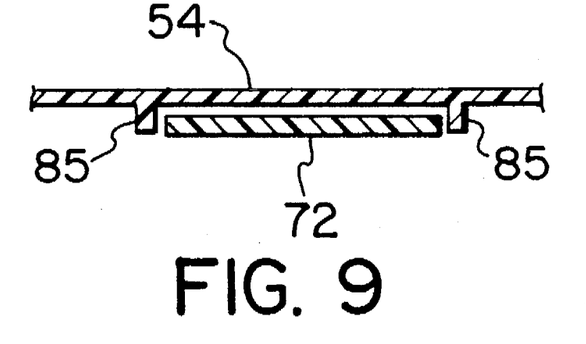
FIGS. 9, 10 and 11 are cross-sectional views taken respectively along lines IX—IX, X—X and XI—XI in FIG. 8.
Figure 10:
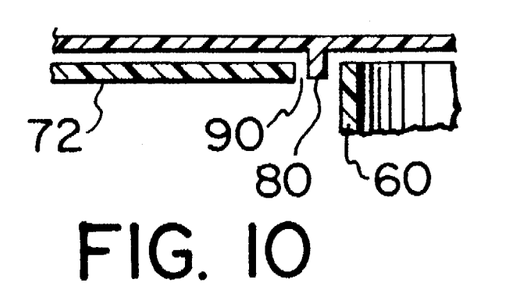

In the holder of the embodiment and according to the invention, the lid itself is provided with part of the means for retaining the windings of fiber within the holder particularly when the holder is in the open position. For this purpose, the lid is provided with a plurality of ribs which briefly, are positioned to extend alongside and around the fingers 70, 72 and 76 and also to lie closely adjacent to the walls 52, 56 and 62. In greater detail and as shown particularly in FIGS. 7 and 8, a substantially continuous rib 80 is disposed so as to lie completely around the inner wall 60 so as to be directed downwardly into the storage chamber 58. This rib 80 is provided with two pairs of radially outwardly extending ribs 82. The ribs 82 of each pair are disposed closely adjacent to and lie alongside an associated rib 70 (see FIG. 8). The ribs 82 extend outwards to a further rib 84 which lies closely adjacent to a base wall 56. In cross-section as shown by FIG. 9, each of the ribs 82 depend one down on each side of a finger 70. The rib 84 to which the ribs 82 extend is provided integrally with two U-shaped rib formations comprising two parallel rib sides 85 and a base rib 86, the U-shaped rib formation extending completely around and lying closely adjacent to two of the cantilever fingers 72. Each of the other three cantilever fingers 72 is provided with a pair of parallel fiber retaining ribs 88 which are disposed adjacent to the sides of these fingers 72 and are integrally formed with the rib 80 as it extends around the storage chamber. These ribs 88 extend downwards around the side of the fingers 72 also in the manner shown in FIG. 9. The ribs 88 terminate at the rib 80 which extends around the end of the three cantilever fingers 72 so that, in cross-section as shown in FIG. 10, the rib 80 extends downwardly into an insertion and removal gap 90 for fiber.

Figure 11:
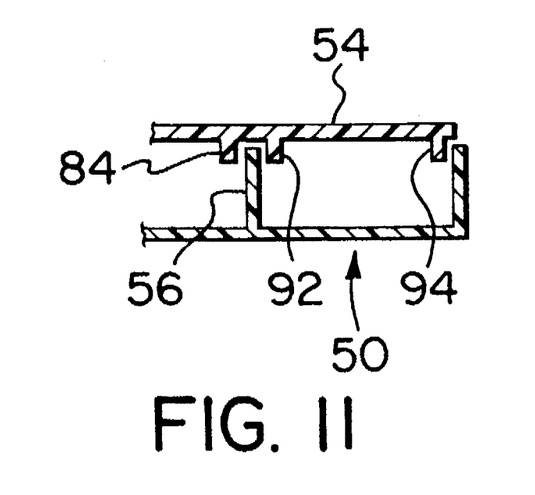

In addition, other ribs 92 and 94 are disposed so as to lie parallel to and depend downwardly so as to overlap top portions of walls of the base while being in close proximity thereto. As a result, and as shown by FIG. 11, these ribs restrict any access of fiber to move around the top of any of the base walls.

It is found that in use of the holder 30 according to the embodiment, the fibers may be easily placed in their wound storage positions within the chamber 58 by following the path illustrated in FIG. 3. For this purpose, the fiber is moved laterally through the gap provided between the free end of each finger and an opposing wall within the base. As shown by FIGS. 8 to 10, the windings of the fiber are then positioned within the chamber 58 and also within the passages of the base and are generally located in position by the retaining fingers. Once the lid is closed into position, the various ribs of the lid either lie alongside the top regions of the walls of the base or depend downwardly around the sides and end of the retaining fingers as shown in FIGS. 9, 10 and 11. With this structure it is found that even though the holder is mounted within the container 10 and may be subjected to wide ranges of temperatures and continuously swaying conditions over long periods of time, there is no tendency for the fibers to fall uncontrollably out of the base of the holder when the holder is opened. The reason for this can be seen from FIGS. 9 to 11. As shown by FIGS. 9 and 10, the fibers 28 extending around the base, cannot move around the end of any cantilever retaining finger because the downwardly depending ribs prevent the fibers from moving upwardly around the side edges or around the ends of any finger. No fiber can therefore be in a position to fall outwardly from the holder upon the lid being removed. In addition, as shown by FIG. 11, with the ribs descending downwardly and overlapping the upper edges of the base walls, fibers are held downwards in the base and away from the top edges of the side walls even along lengths of fiber extending between the cantilever fingers. Again therefore there is no tendency for the fibers to move outwards around the side walls with the base and lid separated. In addition to this, when closing the lid it is extremely difficult for any fiber to become trapped between the lid and an upstanding wall of the base. This is because the fibers are accurately controlled in position by the cantilever fingers and as the lid descends, any fiber which has tended to move upwards towards the top edges of the base walls is immediately pushed down into the base by an opposing rib of the lid.

It follows therefore that the combination of the ribs of lid with the walls of the base result in a construction which is reliable in holding optical fibers within the holder and cannot result in fiber storage and control problems when the container is subsequently opened.

What is claimed is:

1. A storage holder for optical fibers comprising a base and a lid movable for opening or closing an access side to a storage chamber provided within the base for storing the fibers in the form of at least one winding with a minimum bend radius to the winding, and having an inlet and an outlet to the chamber for fibers, and the base and lid having cooperable means to ensure that the at least one winding remains within the storage chamber with the holder closed and remains within the storage chamber with the holder open until manually removed from within the chamber the cooperable means comprising spaced winding retaining means provided by the base, the winding retaining means extending across the access side to the chamber to retain the winding within the chamber, and the winding retaining means providing a winding insertion and removal gap for lateral insertion into and removal of the winding from the chamber, and the cooperable means also comprising at least one rib provided by the lid, the rib extending to a position adjacent to each retaining means to prevent fiber in the winding from entering laterally into the removal gap.

2. A storage holder according to claim 1 wherein each retaining means comprises a cantilever retaining finger extending across the access side to the storage chamber, the finger terminating at a free end at one side of the insertion and removal gap, and the lid is provided with the rib which extends into the access side of the storage chamber, the rib extending laterally of the chamber and adjacent to and alongside the finger.

3. A storage holder according to claim 2 wherein the base has upstanding walls defining the access chamber between them, and at least one rib extends laterally of the chamber substantially completely across and between the upstanding walls.

4. A storage holder according to claim 3 wherein the lid comprises a plurality of ribs each associated with an upstanding wall and which, in a closed position of the lid, extends alongside and lies adjacent to its upstanding walls and is disposed within the access side to the chamber.

5. A storage holder according to claim 4 wherein each rib is associated with an upstanding wall and extends integrally into a rib extending laterally of the chamber.

6. A storage holder according to claim 5 wherein at least one rib extending laterally of the chamber passes at each end integrally into a rib which extends alongside and lies adjacent to each of the upstanding walls.

7. A storage holder according to claim 4 wherein the base is provided with upstanding walls extending from the storage chamber to define passages extending from the storage chamber to the inlet and the outlet.

8. A storage holder according to claim 2 wherein the lid has two ribs which extend laterally of the chamber one along each side of and adjacent to the finger.

9. A storage holder according to claim 8 wherein the two ribs extending laterally of the chamber are interconnected by an intermediate rib region which passes from side-to-side of the finger through the insertion and removal gap.

* * * * *